United States Patent [19]

Yamada et al.

[11] Patent Number: 5,689,326
[45] Date of Patent: Nov. 18, 1997

[54] PHOTOGRAPHIC PRINTING APPARATUS

[75] Inventors: Junji Yamada; Toru Tanibata, both of Wakayama, Japan

[73] Assignee: Noritsu Koki Co., Ltd, Wakayama-Ken, Japan

[21] Appl. No.: 706,503

[22] Filed: Sep. 5, 1996

[30] Foreign Application Priority Data

Sep. 6, 1995 [JP] Japan .................. 7-228758

[51] Int. Cl.⁶ .................. G03B 27/32; G03B 27/46; G03B 27/52
[52] U.S. Cl. .................. 355/39; 355/46; 355/67; 355/71
[58] Field of Search .................. 355/67, 71, 39, 355/40

[56] References Cited

U.S. PATENT DOCUMENTS

| | | | |
|---|---|---|---|
| 5,031,122 | 7/1991 | Witty | 355/39 |
| 5,068,742 | 11/1991 | Oshikoshi et al. | 355/40 |
| 5,337,119 | 8/1994 | Tanibata | 355/40 |
| 5,430,523 | 7/1995 | Tanibata | 355/40 |
| 5,467,165 | 11/1995 | Jacob et al. | 355/40 |
| 5,508,783 | 4/1996 | Iwagaki et al. | 355/40 |
| 5,602,618 | 2/1997 | Tanibata | 355/40 |

*Primary Examiner*—Arthur T. Grimley
*Assistant Examiner*—Shival Virmanl
*Attorney, Agent, or Firm*—Felfe & Lynch

[57] ABSTRACT

A photographic printing apparatus includes an exposing device (5) for printing an image of a photographic film (2) on printing paper (3), a supplementary information exposing device (6) for printing supplementary information, such as a date, time and place of photographing, on part of the printing paper (3), and ND filters (31) or a liquid crystal panel (45, 46) for suppressing light projected to a selected region within a print region when the image of the photographic film (2) is printed on the printing paper (3). The supplementary information exposing device (5) prints the supplementary information in the selected region.

17 Claims, 13 Drawing Sheets

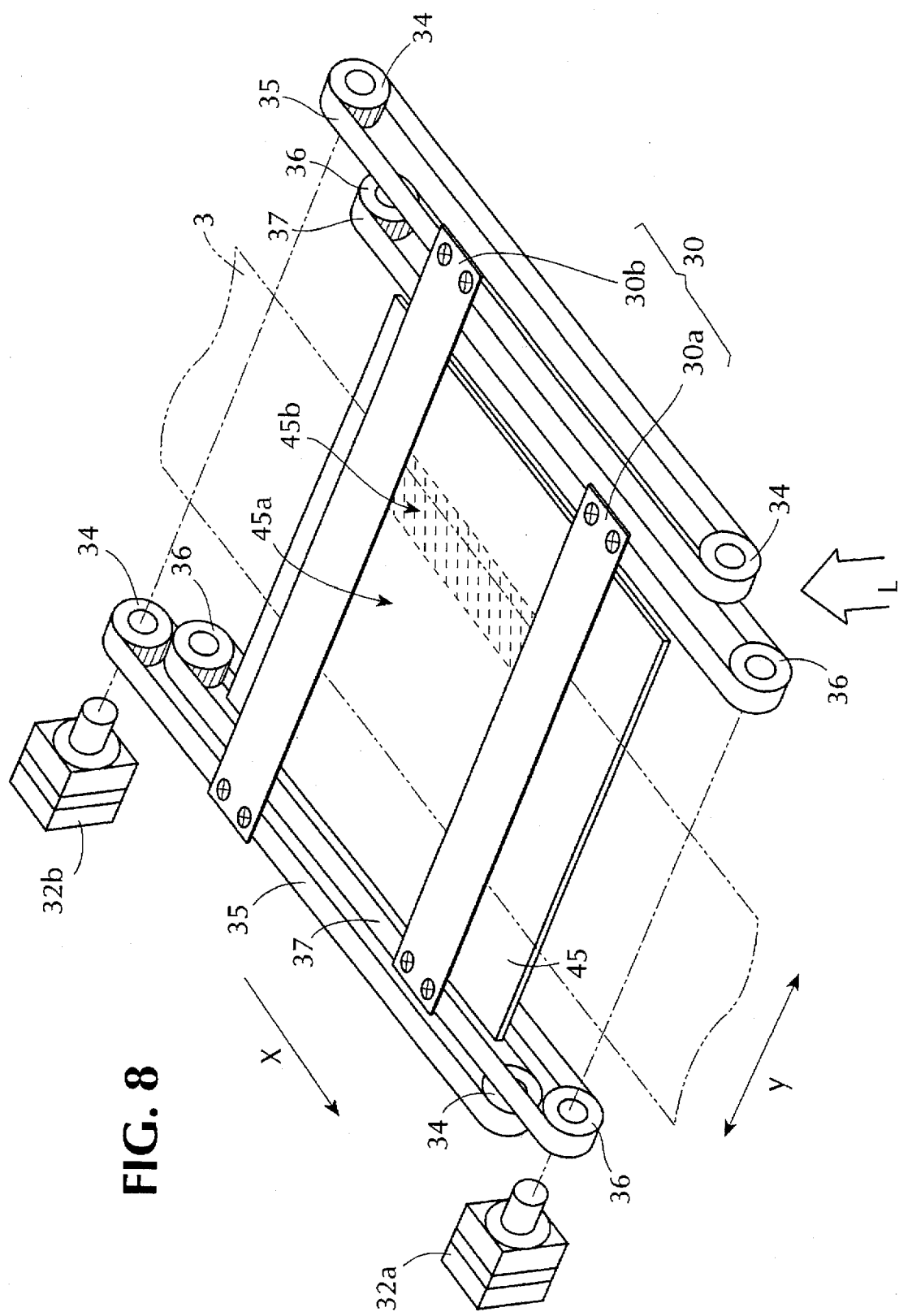

ns, signs or figures, or a combination thereof, or a combination thereof
PHOTOGRAPHIC PRINTING APPARATUS

BACKGROUND OF THE INVENTION

1. Field of the Invention

This invention relates to a photographic printing apparatus having an exposing device for printing images of a photographic film on a photosensitive material, and a supplementary information exposing device for printing supplementary information on part of the photosensitive material.

2. Description of the Related Art

A conventional technique of printing supplementary information on part of a photosensitive material will be described with reference to FIGS. 15 through 17. The supplementary information includes characters, signs or figures, or a combination thereof, or a combination thereof with color, indicating the time and date and/or place of photographing, for example. FIG. 16 shows an image 3a and supplementary information 3b (character information "SUMMER VACATION") printed on printing paper which is a photosensitive material. In the order of printing, the image 3a is printed first, and then the supplementary information 3b is printed in superposition on the image 3a. That is, the image 3a and supplementary information 3b are put to composite exposure. The supplementary information 3b is printed by using a lith film 50 as shown in FIG. 15. The lith film 50 includes a supplementary information portion 50a and a background portion 50b. Where, as shown in FIG. 15(a), the lith film 50 has a black background portion 50b and a transparent supplementary information portion 50a, the supplementary information 3b is printed in black (in deep black) as shown in FIG. 16(a). Conversely, where, as shown in FIG. 15(b), the lith film 50 has a transparent background portion 50b and a black supplementary information portion 50a, the background 3b is printed in black as shown in FIG. 16(b). In the above mode of printing supplementary information, with the supplementary information 3b superposed on a dark portion of the image 3a, part of the supplementary information 3b is hardly visible.

In an improved conventional technique which overcomes the above inconvenience, as shown in FIGS. 17(a) and(b), part of the image 3a is shaded completely with a light shielding plate, and supplementary information 3b is printed on that part. In this case, unlike what is shown in FIGS. 16(a) and(b), the supplementary information 3b is readable However, the improved conventional technique has the following problem to be solved. Because part of the image 3a is shaded completely, that part of the image 3a becomes invisible. Where, as shown in FIG. 17(a), the supplementary information 3b is printed against a white background 3c, part of a print region becomes white to be the same as other regions. This impairs the balance of a print as a whole. Further, the white part of the print region is detrimental to the impression of quality.

SUMMARY OF THE INVENTION

An object of this invention is to provide a photographic printing apparatus for overcoming the disadvantages of the prior art and printing an image and supplementary information both in visible state.

Another object of this invention is to provide a photographic printing apparatus for improving the balance of a print as a whole to give an impression of high quality.

In order to fulfill the above objects, a photographic printing apparatus according to this invention comprises an exposing device for printing an image of a photographic film on a photographic sensitive material, and a supplementary information exposing device for printing supplementary information on part of the photographic sensitive material, in which a dimming device is provided for suppressing light projected to a selected region within a print region when the image of the photographic film is printed on the photographic sensitive material, the supplementary information exposing device being operable to print the supplementary information in the selected region.

With the above construction, light projected to the selected region within the print region is suppressed, and the supplementary information is printed in the selected region. Consequently, both the supplementary information and the image are visible in a resulting print. In the selected region, the image remains visible since only the density of the image is lowered. Since the density of the image is lowered, there is no possibility of part of the supplementary information becoming invisible. Further, part of the print does not become white in the selected region. Thus, the print as a whole has improved balance, and provides a sense of quality.

Preferably, the dimming device is operable to vary the selected region. Then the selected region may have a desired position and size within the print region. That is, the selected region may have a position and size to present the supplementary information and image in an optimal way. The resulting print provides a sense of quality.

A dimming position control device may be provided for determining a size and position of the selected region based on photograph size information of the image of the photographic film, and setting and varying the selected region to be dimmed by the dimming device based on the position and size determined. With this construction, a position and size of the selected region is determined from image size information, to set the selected region to an appropriate position within the print region. Consequently, the dimming control may be executed automatically.

Preferably, the dimming device is operable to dim light by a variable quantity. The quantity of light suppression is not fixed but is variable. This enables varied supplementary information to be printed according to images of the photographic film.

The apparatus may further comprise a density detecting device for detecting density information on the image of the photographic film, and a dimming quantity control device for controlling a quantity of light dimmed by the dimming device based on the density information detected by the density detecting device. The quantity of light dimmed is variable according to image density. That is, instead of fixing a quantity of light dimmed, the quantity is variable according to the density of the selected region where supplementary information is printed. Consequently, a high quality print is obtained in which both the image and supplementary information are seen in an optimal way.

The dimming device may include a plurality of filters having different ratios of transmittance, and a filter drive device for advancing and retracting each of the filters to/from a printing optical path extending to the photographic sensitive material. With this construction, a best suited one of the filters may be selected and driven. The plurality of filters having different ratios of transmittance enables variations in the light dimming quantity. Thus, a print having a sense of high quality is obtained as noted above.

For example, the dimming device may include a nematic liquid crystal panel or smectic liquid crystal panel disposed on a printing optical path extending to the photographic sensitive material. With such a liquid crystal panel, a quantity of light transmitted through part of the liquid crystal panel may be reduced. The liquid crystal panel need not be moved if the panel has a size to cover the print region. That is, it is possible to dispense with a mechanical drive device for varying the dimming light quantity and the selected region.

The dimming quantity control device may determine a voltage to be applied to the nematic liquid crystal panel such that the nematic liquid crystal panel has a predetermined ratio of transmittance. In this way, the light dimming quantity may be varied by selecting a voltage to be applied. Consequently, a desired dimming quantity is obtained through the simple voltage control.

The dimming quantity control device may determine a period for applying a voltage to the nematic liquid crystal panel such that the nematic liquid crystal panel has a predetermined integrated quantity of light transmission. In this way, the light dimming quantity may be varied by selecting a period of voltage application. A control of the voltage application period may advantageously be effected accurately by means of a timer or the like. Consequently, a desired dimming quantity is obtained through the simple control of voltage application period.

A heating device may be provided for heating part of the smectic liquid crystal panel, whereby the smectic liquid crystal panel is placed in disturbed state or transparent state. That is, the portion in disturbed state may act as the selected region. The selected region is variable by varying the portion to be heated.

The dimming device employing a liquid crystal panel as noted above requires a reduced number of mechanical drives, thereby to realize a simplified construction of the photographic printing apparatus.

The supplementary information exposing device may include a lith film recording the supplementary information, and a light source for printing the supplementary information recording on the lith film on the photographic sensitive material. The lith film has, recorded thereon in advance, supplementary information to be printed. The entire supplementary information may be printed on the photographic sensitive material all at a time. Consequently, the supplementary information may be printed in a short time.

The supplementary information exposing device may include an exposure head for dividing the supplementary information into a plurality of regions, and controlling exposure of each of the plurality of regions. By dividing the supplementary information into a plurality of regions, the supplementary information may be stored in a memory. The exposure head may be controlled based on the information stored. Thus, the exposure head may be controlled according to contents of the supplementary information.

The exposure head may include PLZT arrays or LED arrays for exposing, line by line, the supplementary information divided into the plurality of regions. Alternatively, the exposure head may include a CRT. The line by line exposure allows the supplementary information exposing device to be diminished in size. As a result, the entire apparatus may be made compact. The CRT allows the entire supplementary information to be printed on the photographic sensitive material all at once. Consequently, the supplementary information may be printed in a short time. The PLZT or LED arrays may be controlled independently pixel by pixel to enable printing of varied supplementary information. With the CRT, varied color information may be included in the supplementary information, thereby enabling printing of diversified supplementary information.

The supplementary information exposing device may be switchable between an ordinary exposure state for exposing an information portion of the supplementary information to the photographic sensitive material, and a reverse exposure state for exposing a background portion of the supplementary information. The ordinary exposure state or reverse exposure state may be selected according to the image on the photographic film. Thus, various prints of the supplementary information are available to suit images on the photographic film.

The apparatus may further comprise a density detecting device for detecting density information on the image of the photographic film, and an exposure state control device for switching the supplementary information exposing device between the normal exposure state and the reverse exposure state. In the case of an image of low density, an entire print has good balance by exposing the information portion of the supplementary information. Conversely, where the image has high density, an entire print has good balance by exposing the background portion of the supplementary information. With the exposure of the supplementary information switchable based on the image density information, the supplementary information may be printed by taking the balance of an entire print into account. The resulting print gives an impression of high quality.

Other features and advantages of this invention will be apparent from the following description of the preferred embodiments to be had with reference to the drawings.

BRIEF DESCRIPTION OF THE DRAWINGS

FIG. 8 is a perspective view of the principal portion of the second embodiment;

DETAILED DESCRIPTION OF THE PREFERRED EMBODIMENTS

Photographic printing apparatus in the preferred embodiments of this invention will be described hereinafter with reference to the drawings.

Figure 1:
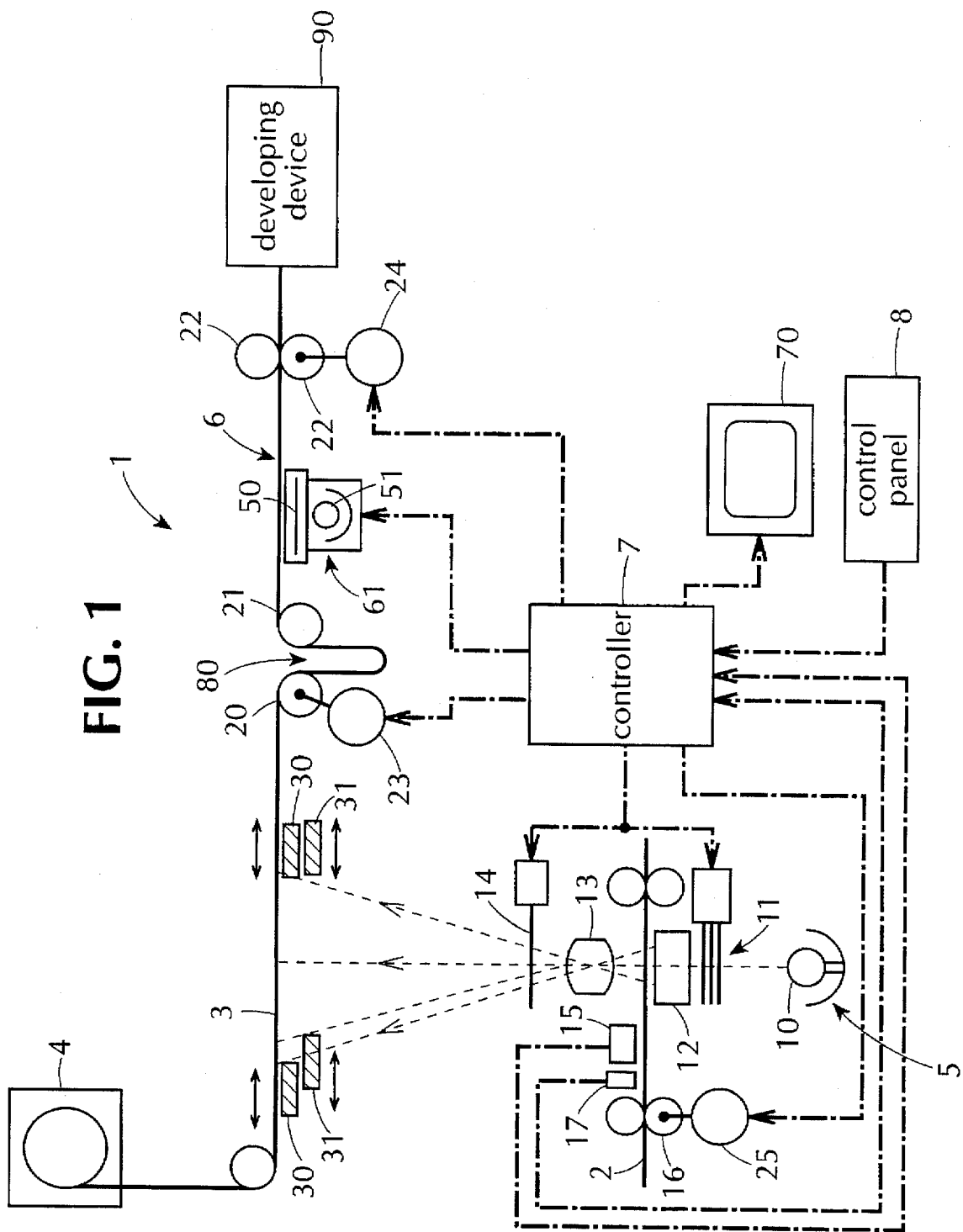
FIG. 1 is a schematic overall view of a first embodiment of this invention.

As shown in FIG. 1, a photographic printing apparatus 1 includes a projecting and exposing device 5 for projecting and exposing images of a photographic film 2 onto printing paper 3 which is a photosensitive material, a supplementary information exposing device 6 for printing supplementary information on the printing paper 3, a loop forming section 80 for forming a loop of the printing paper 3 to transport the printing paper 3 through the projecting and exposing device 5 and supplementary information exposing device 6 independently of each other, a developing device 90 for developing the printing paper 3 exposed at the projecting and exposing device 5, and a controller 7 for controlling operations of various components of the photographic printing apparatus 1. The controller 7 is connected to a control panel (input device) 8 for inputting various information, and a monitor 70 for displaying image information.

The printing paper 3 is drawn from a printing paper magazine 4 storing the printing paper 3 in a roll. Then, the printing paper 3 is exposed at the projecting and exposing device 5 and supplementary information exposing device 6, developed at the developing device 90, and cut and discharged in pieces of a size including image information for one frame.

Light shielding plates 30 and ND filters 31 are arranged opposite a front surface of the printing paper 3. The light shielding plates 30 prevent diffusion of exposing light outside a print region. The ND filters 31 suppress part of light from an exposing light source 10. The ND filter 31 act as a dimming device.

Each component will be described hereinafter.

The projecting and exposing device 5 includes the exposing light source 10, a light adjustment filter 11 for adjusting a color balance of light irradiating the film 2, a mirror tunnel 12 for uniformly mixing colors of light having passed through the light adjustment filter 11, a printing lens 13 for forming the images of the film 2 on the printing paper 3, and a shutter 14, all arranged on the same optical axis providing an exposing optical path.

An image sensor 15 is disposed on a film transport path upstream of the projecting and exposing device 5 for reading each image on the film 2 as divided into numerous regions. The image sensor 15 irradiates the film with white light, separates reflected or transmitted light into the three primaries of red, green and blue, and measures image density, for example, with a CCD line sensor or CCD image sensor. The image sensor 15 acts as a density detecting device. Image information read by the image sensor 15 is transmitted to the controller 7 which computes average density information on the image of the film 2. The computed density information is used to determine the type of ND filters 31. The monitor 70 displays a simulation of an image to be obtained when the printing paper 3 is exposed.

Figure 15A:
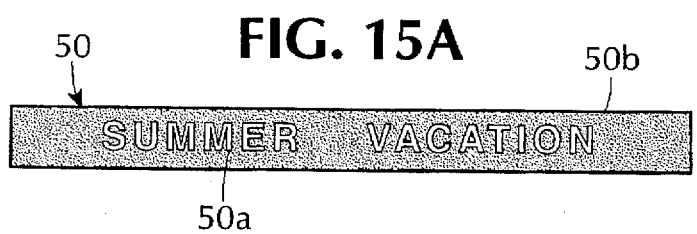
FIG. 15 is a view showing a lith film.
Figure 15B:
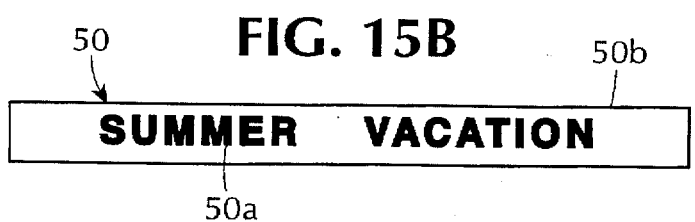
Figure 16A:
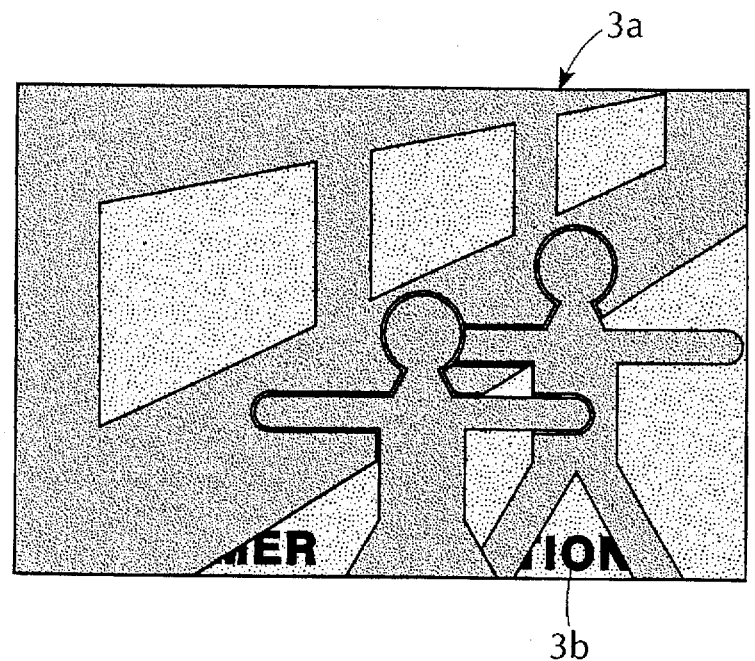
FIG. 16 is a view showing examples of prints made in the prior art.
Figure 16B:
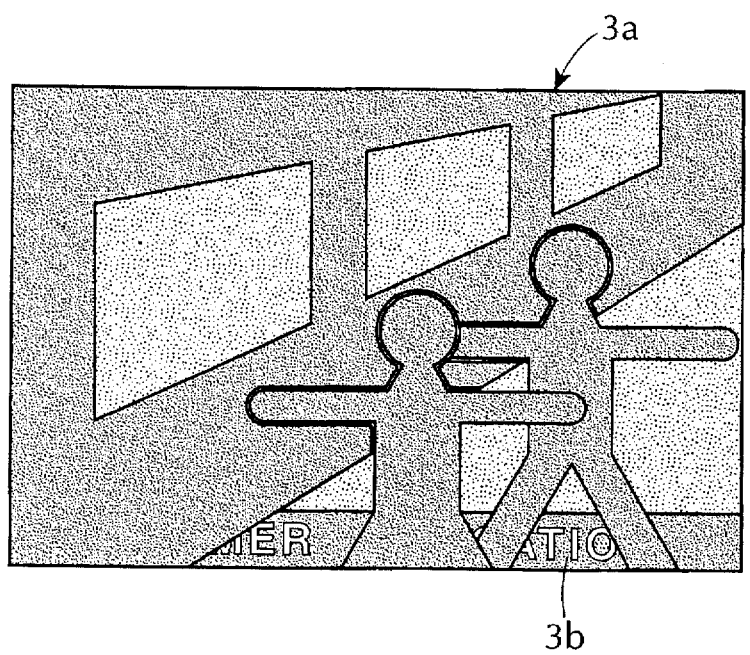

The supplementary information exposing device 6 includes an exposure head 61 connected to the controller 7. The exposure head 61 includes a light source 51 and a lith film 50. The lith film 50 is the same as shown in FIG. 15 which has been described in relation to the prior art.

A roller 16 for feeding the film 2 to the projecting and exposing device 5, and a motor 25 for driving the roller 16, are disposed on the film transport path upstream of a magnetic head 17.

The controller 7 controls the light adjustment filter 11 in the projecting and exposing device 5 based on image information of the film 2 read by the image sensor 15 as the film is fed by the roller 16 and motor 25. As a result, the irradiating light of the projecting and exposing device 5 is adjusted to a color balance according to the color density of an image on the film 2. The projecting and exposing device 5 irradiates the film 2 with the adjusted light to print the image information of the film 2 on the printing paper 3.

The loop forming section 80 includes rollers 20 and 21 for transporting the printing paper 3, and a motor 23 for driving the roller 20. Though not shown in FIG. 1, a flap is disposed between the roller 20 located upstream with respect to a printing paper transport direction and the roller 21 located downstream. The flap is switchable between a position for guiding the printing paper 3 linearly between the rollers 20 and 21, and a position for allowing formation of a loop of the printing paper 3 as shown in FIG. 1. With the printing paper 3 forming a loop, paper transport speeds may be selected fro the projecting and exposing device 5 and supplementary information exposing device 6 independently of each other.

Though not shown, the developing device 90 includes a plurality of tanks storing developing solutions for developing exposed printing paper 3. The printing paper 3 successively passes through these developing tanks to be developed.

Figure 2A:
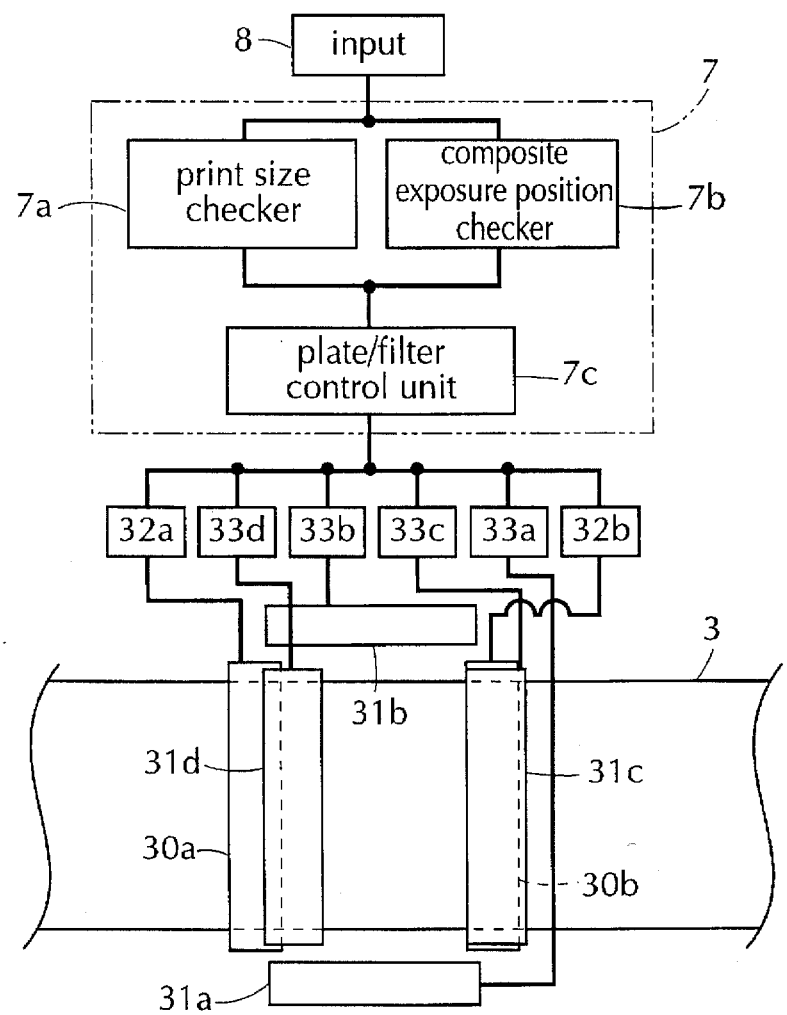
FIG. 2 is a view showing a principal portion of the first embodiment.

The light shielding plates 30 and ND filters 31 will be described with reference to FIG. 2.

The controller 7 includes a print size checker 7a, a composite exposure position checker 7b and a plate/filter control unit 7c. The print size checker 7a determines a print size based on information read from magnetic records 2a on the film 2 and information inputted through the input device 8. The print size corresponds to a size of photographed images on the film 2, which may be full size, half size or panorama size, for example. The composite exposure position checker 7b determines a position and size of composite exposure for printing supplementary information. This determination is based on the information read from magnetic records 2a on the film 2 and information inputted through the input device 8. The plate/filter control unit 7c determines positions of the light shielding plates 30 and ND filters 31 and the type of the latter upon receipt of results outputted from the print size checker 7a and composite exposure position checker 7b. The composite exposure position corresponds to a set region.

The light shielding plates 30a and 30b are arranged in two positions transversely of a print region. Further light shielding plates 30 may be arranged above and below the print region. The ND filters 31a, 31b, 31c and 31d are arranged in four positions to the left and right of and above and below the print region. The light shielding plates 30 completely shield off the exposure light from the light source. The ND filters 31 suppress the exposure light from the exposing light source 10 at the same rate for all frequencies. The light shielding plates 30a and 30b are driven by light shielding plate drivers 32a and 32b, respectively.

The ND filters 31a, 31b, 31c and 31d are driven by filter drivers 33a, 33b, 33c and 33d, respectively. In FIG. 2, one ND filter 31 is disposed in each of the positions to the left and right of and above and below the print region. In an actual situation, a plurality of filters having different densities are disposed in each position. Different densities result in different ratios of transmittance. The plate/filter control unit 7c controls a selection among the ND filters 31 for an appropriate density.

By arranging the ND filters 31 of different densities, it is possible to vary amounts of suppression of the light emitted from the exposure light source. The plurality of filters may be driven independently of one another to advance into a printing optical path for the printing paper 3 and retract therefrom. This enables supplementary information to be printed to satisfy the taste of the user. The filter drivers 33a, 33b, 33c and 33d and the controller 7 act as a dimming position control device.

Figure 2B:
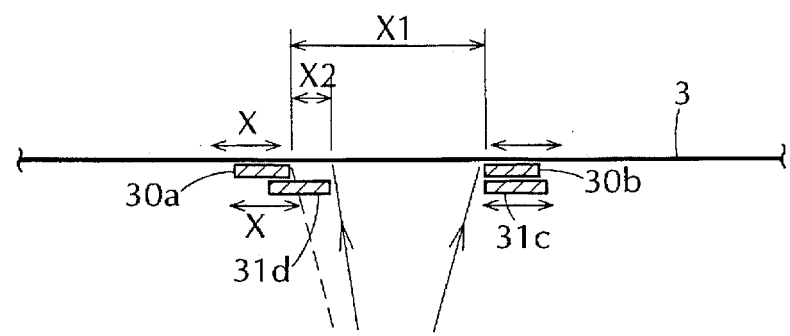

As shown in FIG. 2(b), where the print region has a dimension X1 in the printing paper transport direction, the lefthand ND filter 31d protrude into the print region by a dimension X2.

The light shielding plates 30 and ND filters 31 will be described in greater detail with reference to FIG. 3. To facilitate understanding, it is assumed that the light shielding plates 30 are arranged in two positions, and the ND filters 31 also in two positions. The light shielding plate 30a has a rectangular shape, with longitudinally opposite ends thereof connected to belts 37, respectively. The belts 37 are driven by motor 32a through rollers 36. Similarly, the light shielding plate 30b is connected to belts 35 driven by motor 32b through rollers 34. The ND filter 31a has a rectangular shape, with longitudinally opposite ends thereof connected to belts 39, respectively. The belts 39 are driven by motor 33a through rollers 38. Similarly, the ND filter 31b is connected to belts 41 driven by motor 33b through rollers 40.

Figure 3:
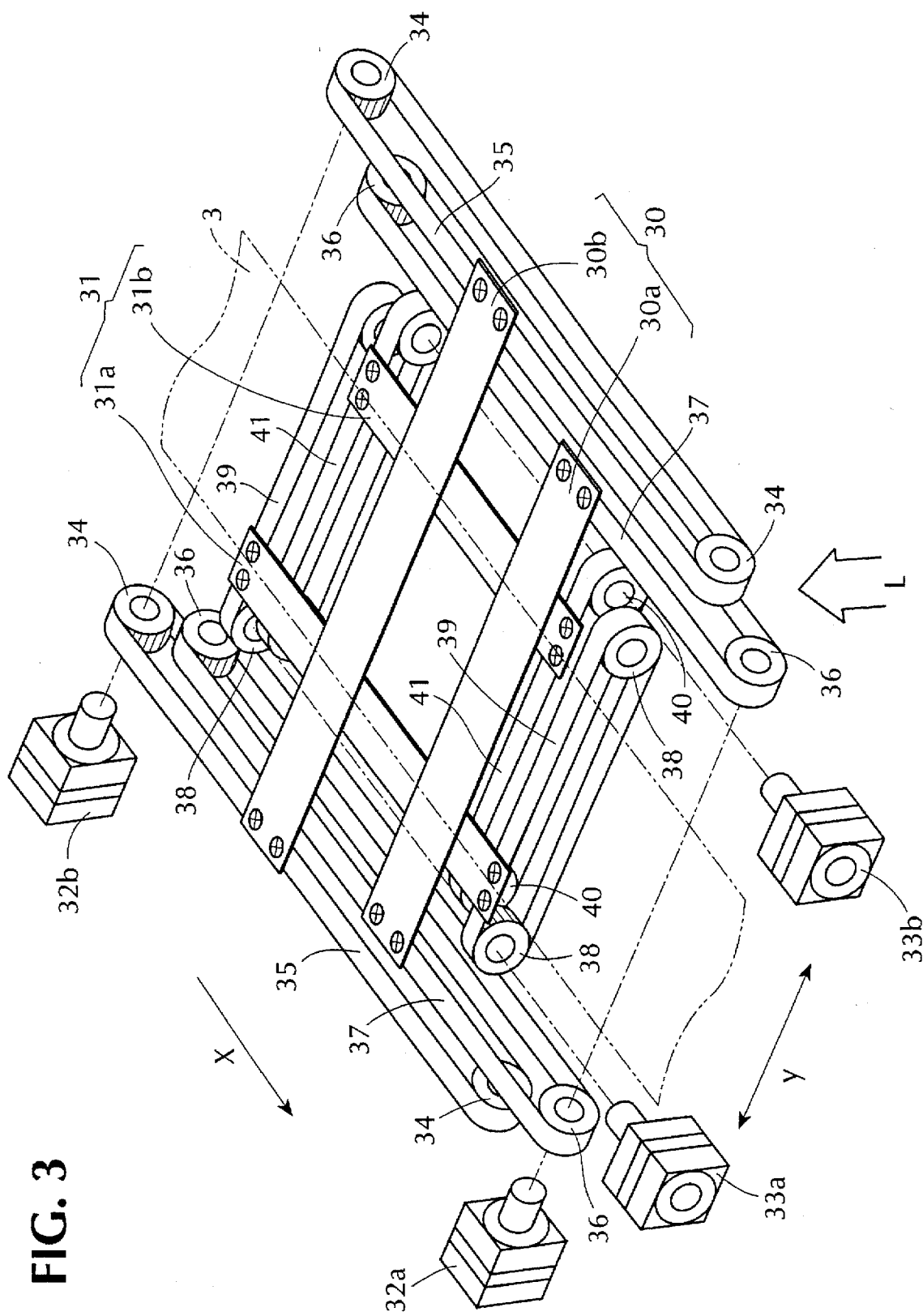
FIG. 3 is a perspective view of the principal portion of the first embodiment.

In FIG. 3, the light shielding plates 30 are driven in direction X parallel to the transport direction of printing paper 3. The filters 31 are driven in direction Y perpendicular to the transport direction of printing paper 3. Arrow L indicates a direction of incidence of the exposing light.

The light shielding plates 30 may be set to selected positions over the printing paper 3 by controlling the motors 32a and 32b. The ND filters 31 may also be set to selected positions over the printing paper 3 by controlling the motors 33a and 33b. Varied positions of composite exposure may be selected through the positional control of the ND filters 31. Consequently, supplementary information may be printed in a selected position within the print region.

The motors 33a and 33b, rollers 38 and 40, and belts 39 and 41, act as a filter drive device.

Figure 5:
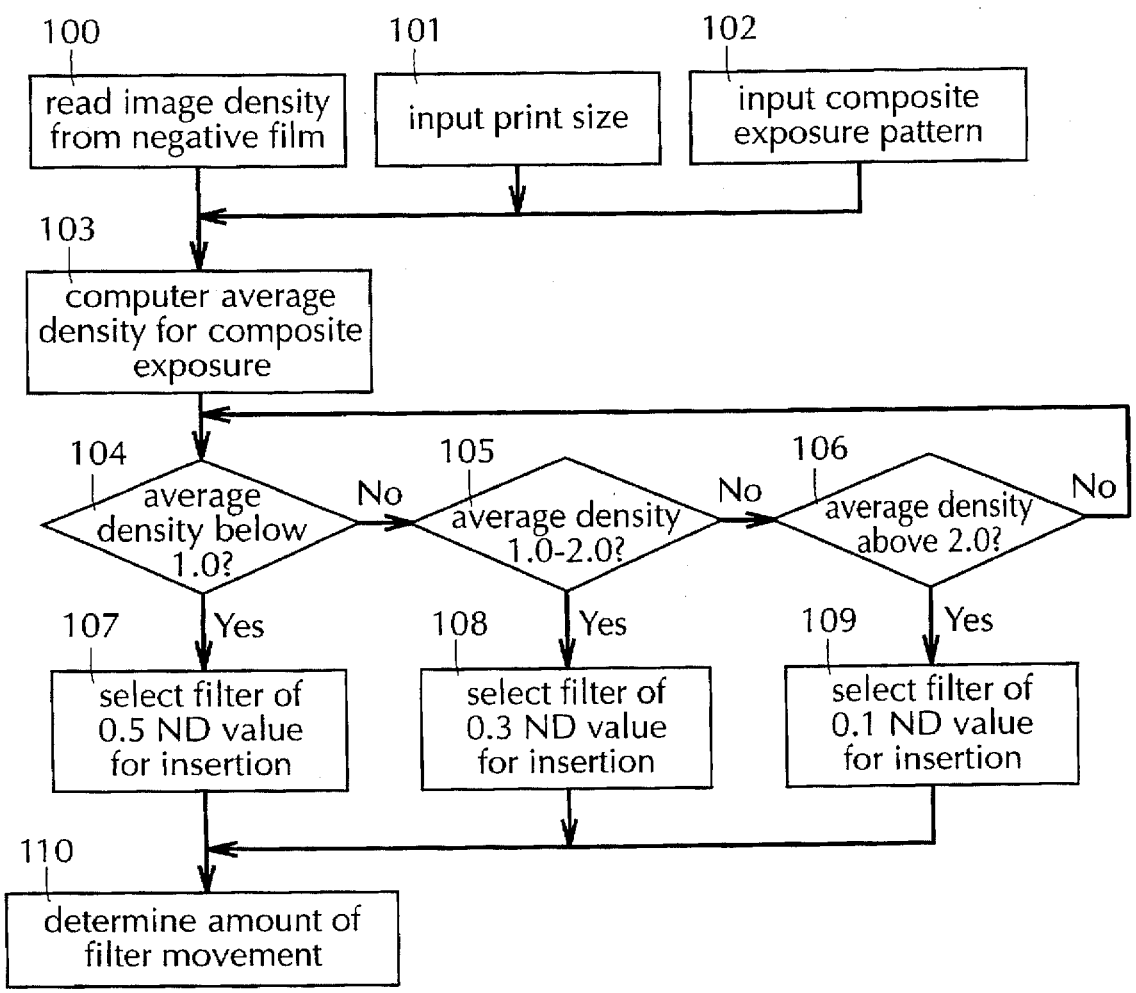
FIG. 5 is a flowchart of operation of the first embodiment.

An operation for selecting among the ND filters 31 will be described with reference to FIG. 5. First, the density of an image on the film 2 is read from the image information provided by the image sensor 15 (step #100). A print size and a composite exposure pattern are inputted through the input device 8 (steps #101 and #102). The composite exposure pattern means information regarding a position, size and so on of supplementary information to be printed. This information may be read from the film 2. Based on the information read and inputted, an operating unit of the controller 7 computes an average density of a position of composite exposure (step #103). An ND filter 31 to be inserted is determined from the average density computed. If the average density is less than 1.0 (step #104), ND filter 31 having an ND value of 0.5 is selected for insertion (step #107). If the average density is above or equal to 1.0 but less than 2.0 (step #105), ND filter 31 having an ND value of 0.3 is selected for insertion (step #108). If the average density is equal to or above 2.0 (step #106), ND filter 31 having an ND value of 0.1 is selected for insertion (step #109). After determining ND filter 31 to be inserted, the operating unit of the controller 7 determines an amount of movement of ND filter 31 to the position of composite expose (step #110).

In this way, the controller 7 selects ND filter 31 of appropriate density based on average density information. That is, an amount of light suppression is controlled based on average density information. The controller 7 acts also as a light suppression control device.

Figure 6A:
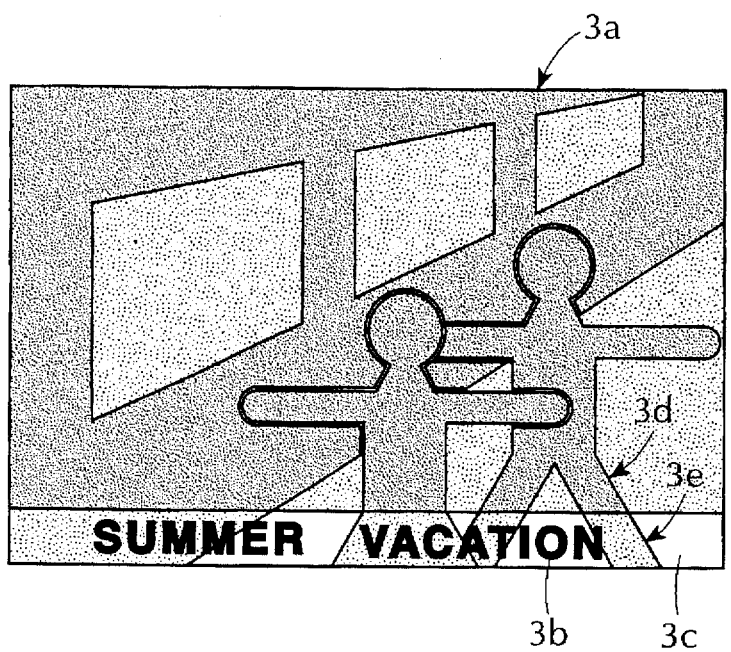
FIG. 6 shows examples of prints made according to this invention.
Figure 6B:
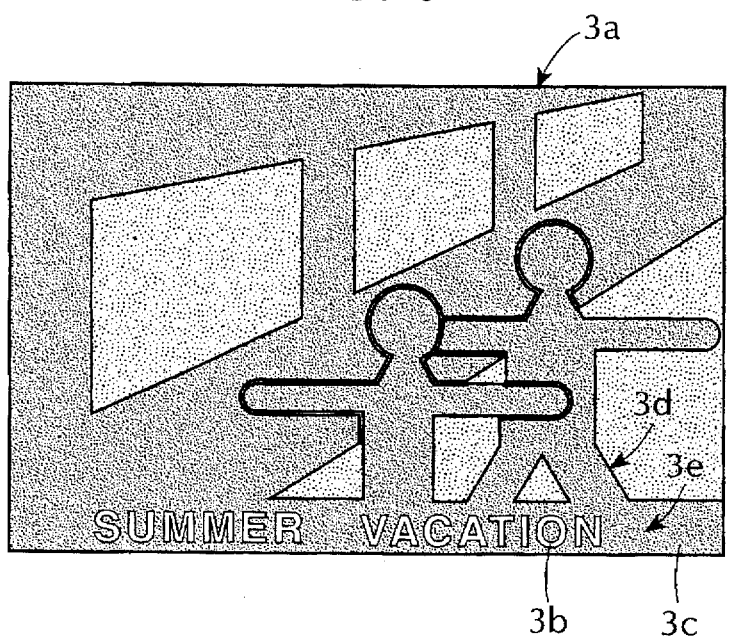

FIG. 6 shows results of printing according to this invention. Image 3a has density in a composite exposure position 3e reduced by a fixed ratio to density in the other region 3d. That is, the image 3a remains visible in the composite exposure position also. With the image density in the composite exposure position reduced, entire supplementary information 3b is also visible, with no part thereof being tipped or lost from view. The print exemplified in FIG. 6(a) results from use of the lith film 50 shown in FIG. 15(a). This example includes supplementary information in characters "SUMMER VACATION" exposed therein. The prim exemplified in FIG. 6(b) results from use of the lith film 50 shown in FIG. 15(b). This example has, exposed therein, a background to the supplementary information in characters. The former is called a normal exposure state, and the latter a reverse exposure state. To switch between the two exposure states, the exposure head 61 may have two lith films 50 for the respective exposure states. To print varied types of supplementary information, a plurality of lith films 50 may be used selectively. The reversed exposure provides a better balance of an entire print where the entire print or the composite exposure position thereof has increased density.

In the reversed exposure, the image is visible in character portions as shown in FIG. 6(b). In this case, the image is visible also in the background portion by suppressing exposure of the background portion.

Although already described in relation to the prior art, supplementary information will be described more particularly below.

Where, for example, the supplementary information is a date of photographing, such as "1995.10.1", this consist of signs and numerals. Supplementary information such as film sensitivity "ISO400" consists of characters and numerals. Overexposure information such as "+1.5" consists of a sign and numerals.

A "figure of the red sun" is information consisting of a figure and color. The supplementary information may include both the above film sensitivity and overexposure information. In this case, the supplementary information is a combination of characters and numerals. Thus, various examples are conceivable for supplementary information.

[Second Embodiment]

Figure 7A:
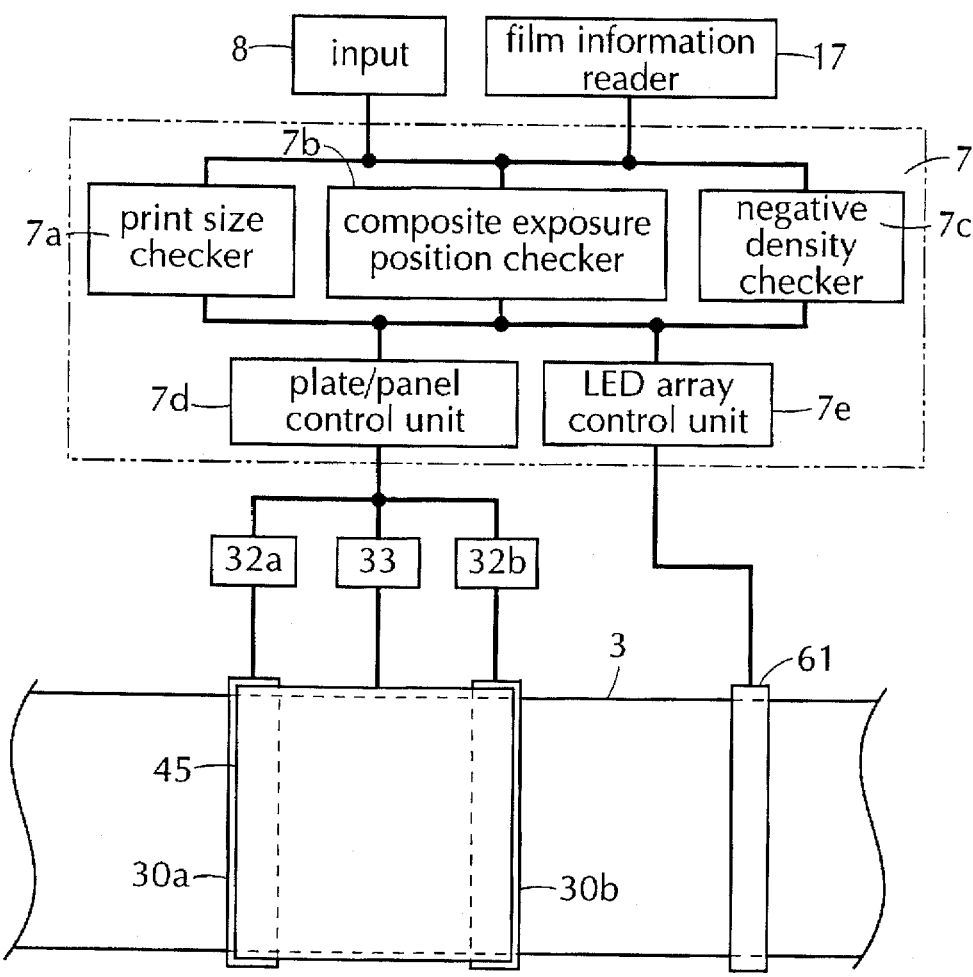
FIG. 7 is a view showing a principal portion of a second embodiment of this invention.
Figure 7B:
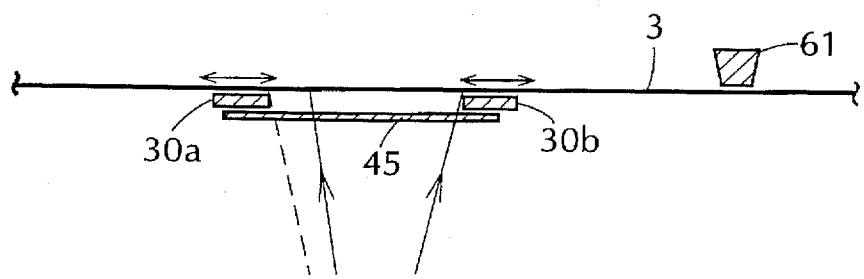
Figure 9:
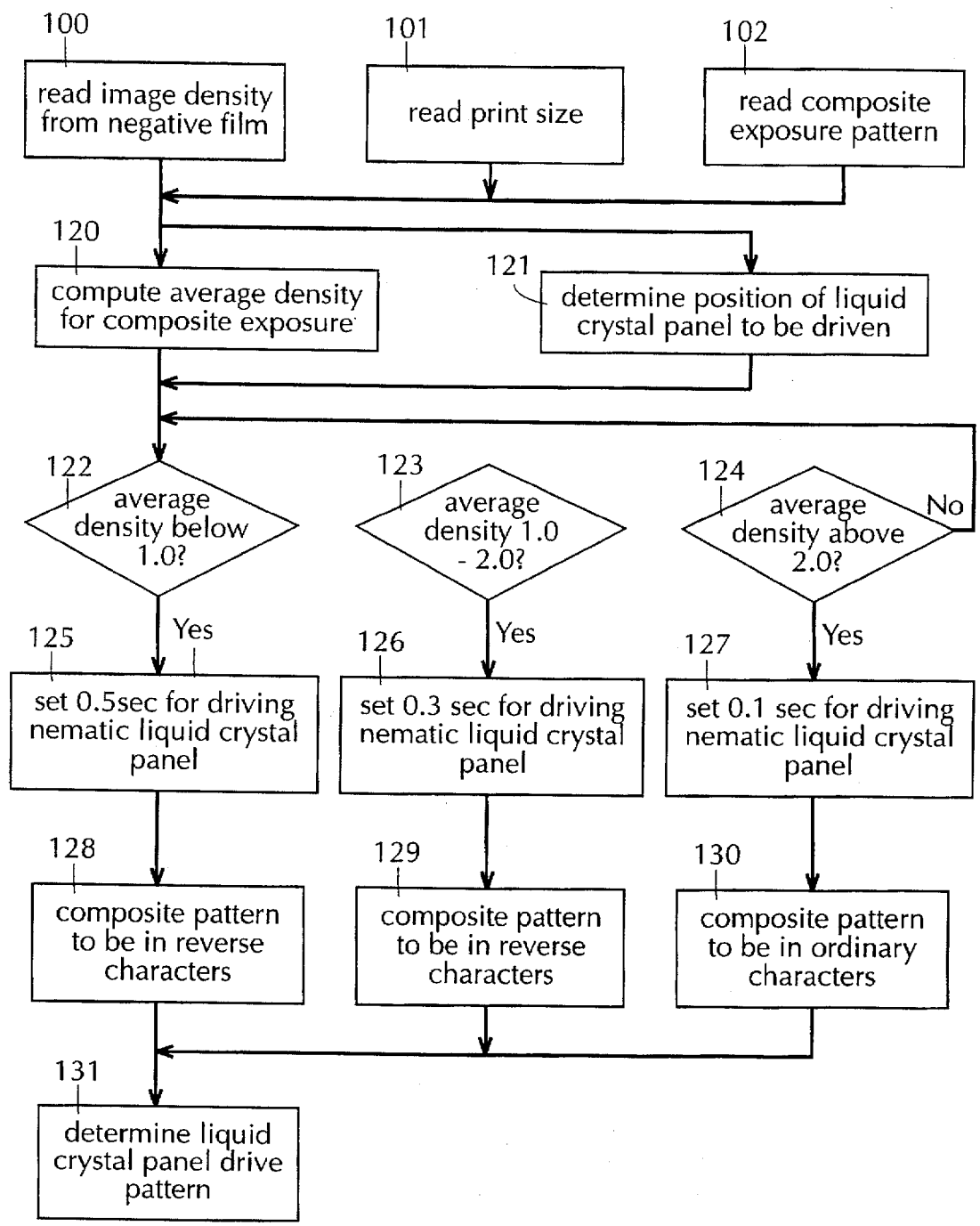
FIG. 9 is a flowchart of operation of the second embodiment.

A second embodiment will be described next with reference to FIGS. 7 through 9.

The controller 7 includes a print size checker 7a, a composite exposure position checker 7b, a negative density checker 7c, a plate/liquid crystal panel control unit 7d and an LED array control unit 7e. The input device 8 and film information reader 17 are connected to the controller 7. The print size checker 7a and composite exposure position checker 7b have the same functions as in the first embodiment. The negative density checker 7c determines a level of avenge density of images of the film 2. The plate/liquid crystal panel control unit 7d controls positions of the light shielding plates 30 and driving of a nematic liquid crystal panel 45 upon receipt of results outputted from the print size checker 7a, composite exposure position checker 7b and negative density checker 7c. The LED array control unit 7e drives the LED arrays in the exposure head 61 upon receipt of the results outputted from the print size checker 7a, composite exposure position checker 7b and negative density checker 7c.

Figure 4:
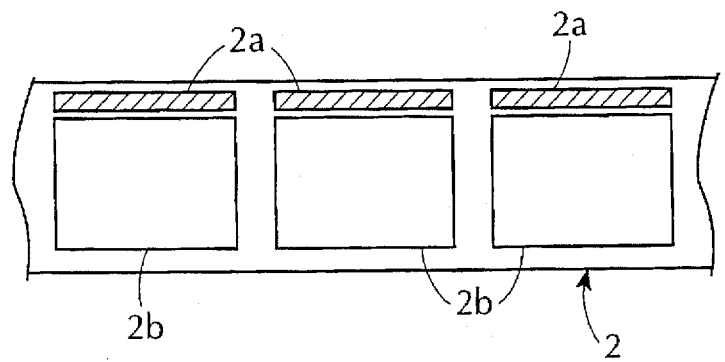
FIG. 4 is a fragmentary view of a film used in this invention.

Information stored in the magnetic records 2a on the film 2 shown in FIG. 4 is read by a magnetic head 17 disposed on the film transport path upstream of the image sensor 15 (see FIG. 1). This magnetic head 17 corresponds to the film information reader. The magnetic records 2a on the film 2 store information written by a camera, such as the type of camera used, the type of lens used, frame numbers, film sensitivity, time and date of photographing, designation of false zoom/panorama, rear light/under- or over-exposure photographing, flash photography or not, flash color temperatures, shutter speeds, diaphragm, subject distances, camera angles in time of photography, sites of photography, subject titles such as "snow-covered mountain", "setting sun" or "people", photographic memos and so on.

The information read by the magnetic head 17 is used to compute exposure conditions for exposing, at the projecting and exposing device 5, a frame 2b corresponding to the magnetic record 2a from which the information is read. This information is used also by the supplementary information exposing device 6 in exposing supplementary information on the printing paper 3, in superposition on the image of the film 2.

The nematic liquid crystal panel 45 is disposed on the printing optical path of the printing paper 3 and opposed to the front surface of the printing paper 3. The nematic liquid crystal panel 45 has a size to cover the print region completely. The light shielding plates 30a and 30b are arranged in an upstream position and a downstream position with respect to the direction of transport of the printing paper 3. The light shielding plates 30a and 30b are driven by light shielding plate drivers 32a and 32b, respectively. The nematic liquid crystal panel 45 is connected to a liquid crystal driver 33. The nematic liquid crystal panel 45 acts as a dimming device. The exposure head 61 includes the LED arrays for exposing supplementary information line by line.

Figure 12:
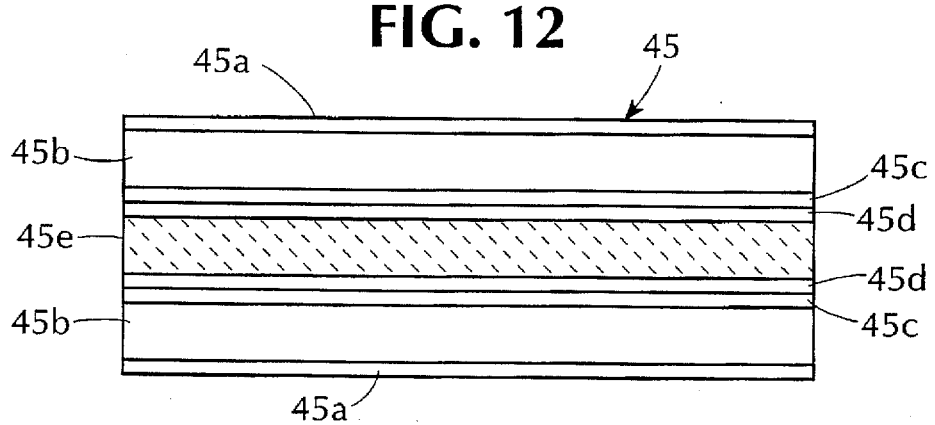
FIG. 12 is a sectional view of a nematic liquid crystal panel.

The nematic liquid crystal panel 45 has a structure as shown in FIG. 12. The panel 45 includes polarizing plates 45a arranged on outer surfaces of two transparent plates 45b, respectively. Transparent electrodes 45c and orientation layers 45d are formed on inner surfaces of the transparent plates 45b. Nematic liquid crystals 45e are sandwiched between the two transparent plates 45b. The nematic liquid crystal panel 45 transmits light when a voltage is applied to the transparent electrodes 45c.

Figure 14A:
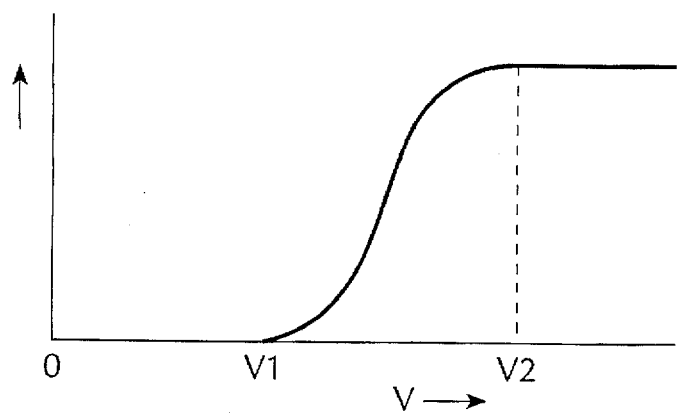
FIG. 14 is a characteristic view of the nematic liquid crystal panel.
Figure 14B:
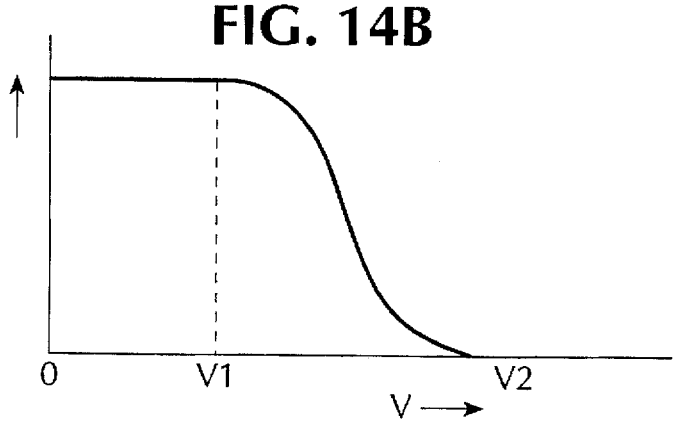

FIG. 14 shows a relationship between light transmittance and applied voltage in the nematic liquid crystal panel 45. As shown in FIG. 14(a), the transmittance is minimum when voltage applied is V1 or less, and maximum when voltage applied is V2 or more. The transmittance varies between voltages V1 and V2. It is therefore possible to control voltage application to obtain a selected value of light transmittance. It is also possible to control an integrated quantity of light transmitted through the nematic liquid crystal panel 45 to be a set value by controlling a period of time of voltage application by means of a timer or the like.

Figure 17A:
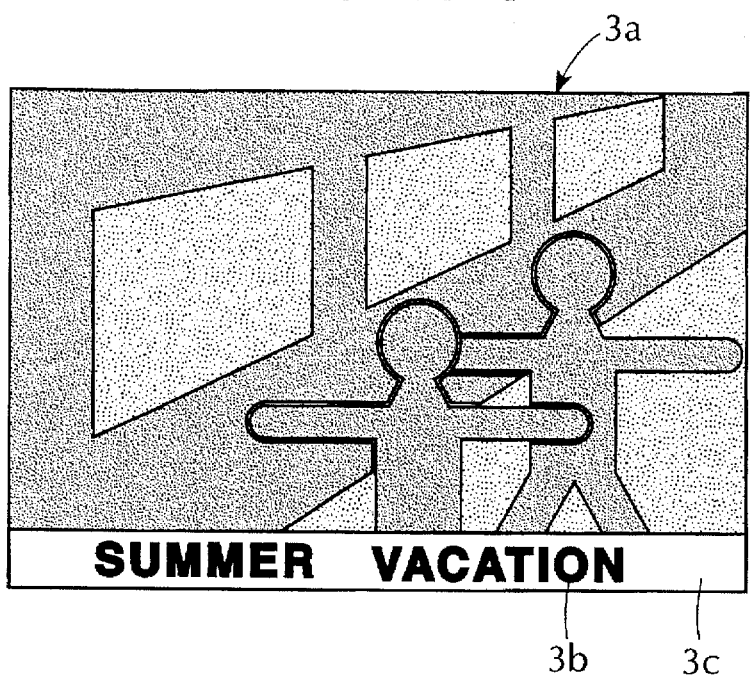
FIG. 17 is a view showing further examples of prints made in the prior art.
Figure 17B:
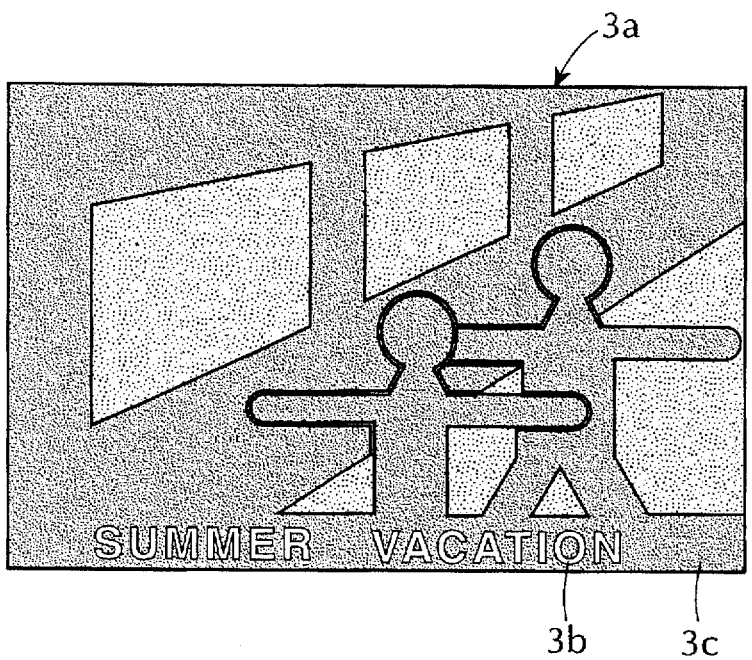

In this way, an amount of light suppression may be set by using the nematic liquid crystal panel 45 and controlling applied voltage and time of voltage application. The applied voltage and time of voltage application are controlled by the controller 7. Light may be shielded off during voltage application by arranging the axes of polarization of the polarizing plates 45a at right angles. As shown in FIG. 17(b), light may be transmitted during voltage application by arranging the axes of polarization of the polarizing plates 45a parallel to each other.

Referring to FIG. 8, the construction relating to the light shielding plates 30 is the same as in the first embodiment. The nematic liquid crystal panel 45 is fixed to be immovable. The nematic liquid crystal panel 45 has a semitransparent portion 45b formed in an appropriate position for varying the position and size of composite exposure as desired. The use of the nematic liquid crystal panel 45 has an advantage over the use of ND filters 31, of simplifying the construction of the entire apparatus in that less components require mechanical drive.

The semitransparent portion 45 may be formed in an appropriate position of the nematic liquid crystal panel 45 by arranging the transparent electrodes 45c in matrix form. Further, with the nematic liquid crystal panel 45 having a size for completely covering the print region, portions outside the print region may be made semitransparent. That is, the semitransparent portions may have the same function as the light shielding plates 30. Then, the light shielding plates 30 may be dispensed with, to further simplify the construction of the entire apparatus. In FIG. 8, arrow X indicates the direction of transport of the printing paper 3, and arrow Y indicates a direction perpendicular to the transport direction. Arrow L indicates a direction in which the exposing light enters the print region.

The exposure head 61 includes a plurality of LED arrays and lenses arranged linearly over the width of the printing paper 3. In this case, supplementary information is not printed all at a time. The supplementary information is divided into numerous regions, and the divided regions are successively exposed. Varied information may be printed by turning on and off the plurality of LED arrays. The plurality of LED arrays are controlled independently of one another.

When one line of supplementary information has been printed with an LED array, the motor 24 is driven to cause the roller 22 to transport the printing paper 3 by a distance corresponding to one line. This printing operation is repeated while shifting the supplementary information line by line.

An operation for controlling the nematic liquid crystal panel 45 will be described with reference to FIG. 9. First, the image sensor 15 reads the density of the film 2 (step #100). The film information reader 17 reads a print size and a composite exposure pattern (steps #101 and #102). Based on the information read, the operating unit of the controller 7 computes an average density of a position of composite exposure (step #120). The operating unit determines a position of the nematic liquid crystal panel 45 to be driven for the composite exposure position (step #121). An average density level of the composite exposure position is determined from results of steps #120 and #121. If the average density is less than 1.0 (step #122), the time for driving the nematic liquid crystal panel 45 is set to 0.5 sec. (step #125). Further, the pattern presenting the supplementary information is determined to be in reverse characters (reverse exposure) (step #128). If the avenge density is above or equal to 1.0 but less than 2.0 (step #123), the time for driving the nematic liquid crystal panel 45 is set to 0.3 sec. (step #126). Further, the pattern presenting the supplementary information is determined to be in reverse characters (step #129). If the avenge density is equal to or above 2.0 (step #124), the time for driving the nematic liquid crystal panel 45 is set to 0.1 sec. (step #127). Further, the pattern presenting the supplementary information is determined to be in ordinary characters (ordinary exposure) (step #130). The ordinary exposure and reverse exposure are controlled by the controller 7. That is, the controller 7 acts as a exposure condition control device.

In this way, a pattern for driving the nematic liquid crystal panel 45 is determined (step #131). That is, an applied voltage and voltage application time are determined.

[Third Embodiment]

Figure 10:
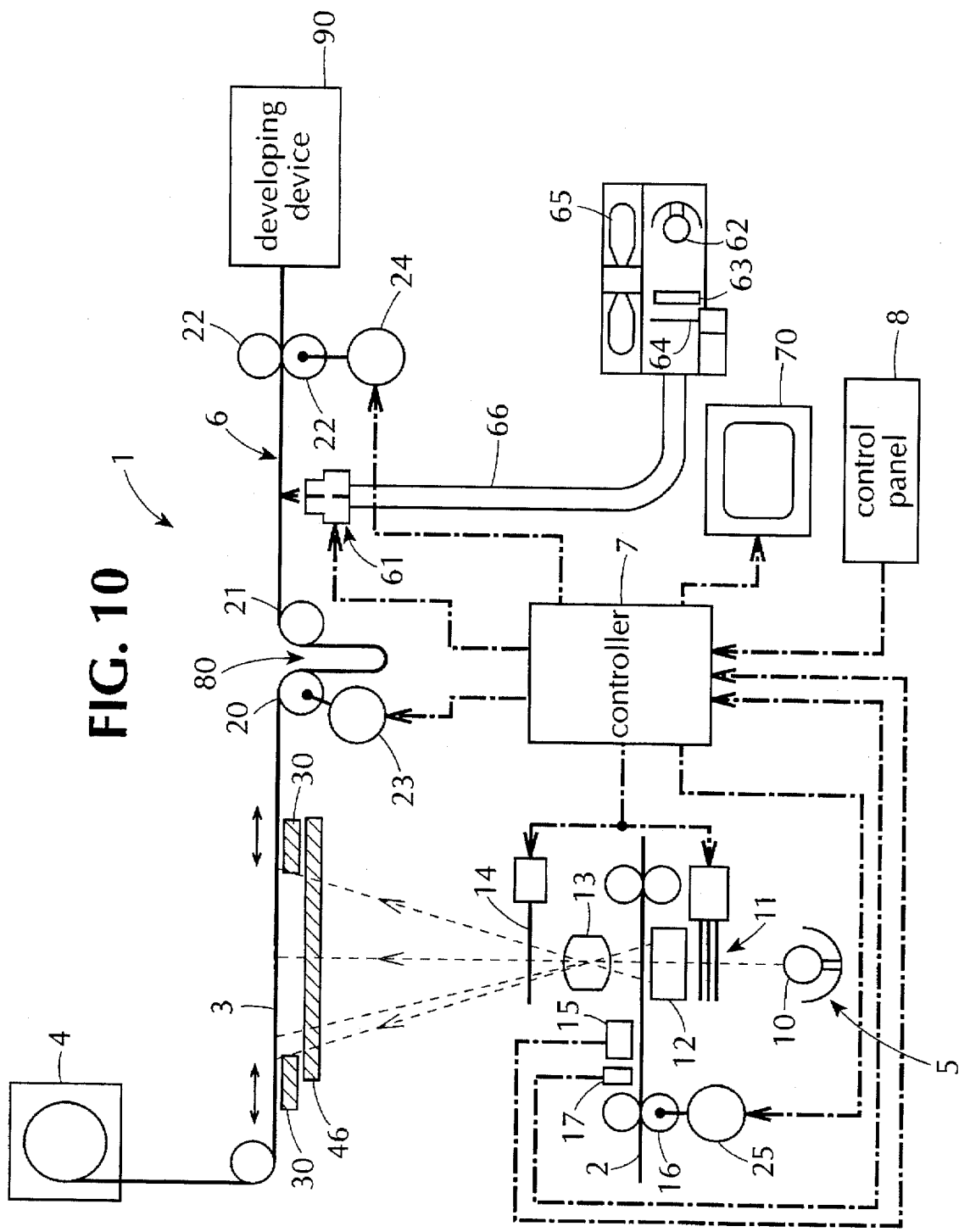
FIG. 10 is a schematic overall view of a third embodiment of this invention.

A third embodiment will be described next with reference to FIG. 10. This embodiment is different from the first embodiment in the following respect.

The light shielding plates 30 and a smectic liquid crystal panel 46 are disposed opposite the front surface of the printing paper 3. The supplementary information exposing device 6 includes a PLZT print head 61 acting as the exposure head.

Various components will be described hereunder.

The supplementary information exposing device 6 includes an exposure light source 62, an IR cut filter 63 for excluding infrared rays from the light emitted from the light source 62, a shutter 64, the PLZT print head 61, and an optical fiber 66 for transmitting the light from the light source 62 to the PLZT print head 61. The exposure light source 62, IR cut filter 63 and shutter 64 are mounted in one box along with a cooling fan motor 65.

Though not shown, the PLZT print head 61 includes a plurality of PLZTs disposed between polarizers and analyzers, and arranged linearly in a direction perpendicular to the direction of transport of the printing paper 3. The PLZT print head 61 acts as an optical shutter for varying a voltage applied between a pair of electrodes of each PLZT to vary a direction of polarization of the light passing between the electrodes, thereby to determine whether to allow passage of the light through each PLZT or not.

Thus, voltages applied to the plurality of PLZTs are controlled independently of each other to print varied supplementary information on the printing paper 3.

A roller 22 for transporting the printing paper 3 and a motor 24 for driving the roller 22 are disposed on the printing paper transport path downstream of the supplementary information exposing device 6.

When one line of supplementary information has been printed by the PLZT print head 61, the motor 24 is driven to cause the roller 22 to transport the printing paper 3 by a distance corresponding to one line. Thus, the supplementary information exposing device 6, under control of the controller 7, prints the supplementary information divided into lines while the motor 23 repeatedly shifts the supplementary information line by line.

Figure 11:
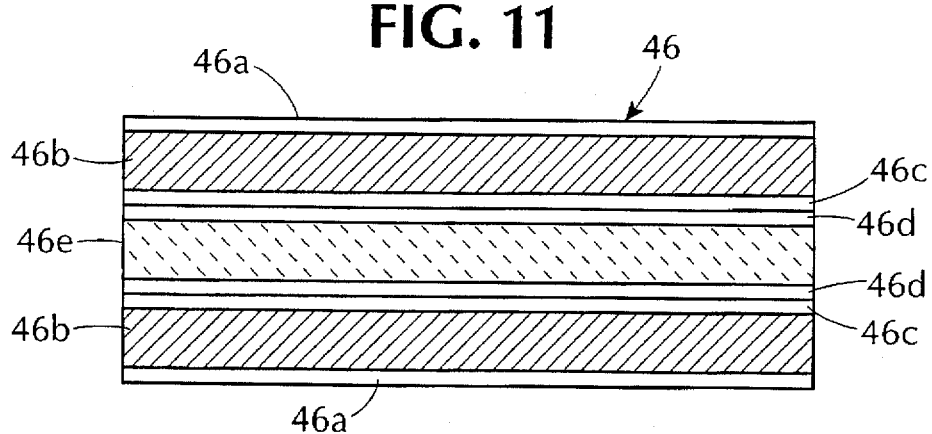
FIG. 11 is a sectional view of a smectic liquid crystal panel.

The smectic liquid crystal panel 46 has a structure as shown in FIG. 11. The panel 45 includes transparent electrode heaters 46a arranged on outer surfaces of two transparent plates 46b, respectively. Transparent electrodes 46c and orientation layers 46d are formed on inner surfaces of the transparent plates 46b. Smectic liquid crystals 46e are sandwiched between the two transparent plates 46b.

When the smectic liquid crystal panel 46 is irradiated with a laser beam, temperature increased in irradiated portions, and smectic crystals 46e are transformed into an isotropic liquid. The isotropic liquid, by being quenched, returns to smectic crystals having a focal conic structure. The smectic liquid crystals 46e are then in disturbance. On the other hand, the isotropic liquid, by being annealed along with voltage application, returns to smectic crystals having a homeotropic structure. The smectic liquid crystals 46e are then transparent.

Thus, a semitransparent portion may be formed by the smectic crystals 46e in disturbed state. The position and size of a selected region may be controlled by controlling a region to be irradiated with a laser beam. The laser beam acts as a heating device.

[Other Embodiments]

Other embodiments will be set out below.

(1) The ND filters 31 in the first embodiment are applicable to the other embodiments. The liquid crystal panels 45 and 46 in the second and third embodiments are applicable to the other embodiments. The exposure head having lith film 50 in the first embodiment is applicable to the other embodiments. The exposure head having LED arrays in the second embodiment is applicable to the other embodiments. The exposure head having PLZT arrays in the third embodiment is applicable to the other embodiments.

(2) In the foregoing embodiments, the supplementary information exposing device 6 includes the PLZT print head 61 or the like. Instead, an image on a CRT may be exposed to the printing paper 3. Exposure may be controlled for each of pixels constituting a CRT image. Diverse color information may also be given. Instead of being arranged in a row, the LED arrays may be arranged in dot matrix form to expose the printing paper 3. Various other arrangements may be made.

(3) The nematic liquid crystal panel or smectic liquid crystal panel may be moved into and out of the printing optical path in the first embodiment. In this case, the liquid crystal panel may have a size corresponding to the composite exposure position.

(4) In this invention, the position and size of composite exposure are determined based on image size information read from the film 2. Not only the image size information but printing paper size information may also be used to make this determination.

Figure 13:
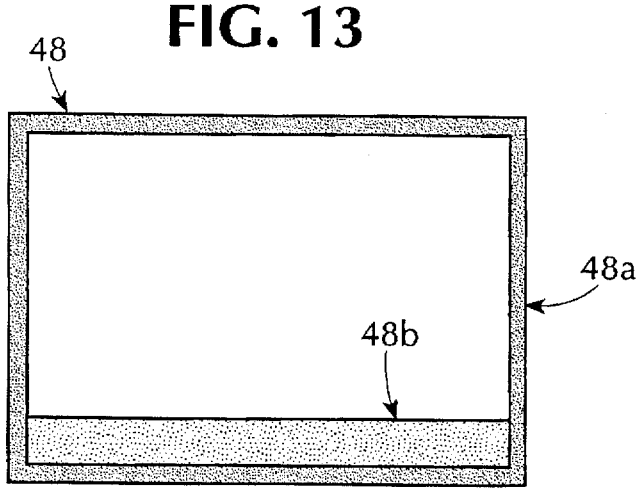
FIG. 13 is a view of a mask used in a further embodiment of this invention.

(5) A panel 48 as shown in FIG. 13 may be employed as the dimming device of this invention. This panel 48 has a transparent sheet defining black edges 48a having the same function as the light shielding plates, and a semitransparent portion 48b for dimming light. A plurality of panels 48 having semitransparent portions 48b of varied density levels may be used selectively.

(6) The photographic film 2 in this invention may be a negative film or positive film.

(7) In the foregoing embodiments, ND filters 31 and the like acting as the dimming device are arranged opposite the front surface of the printing paper 3. The components may be arranged adjacent the film 2, instead.

What is claimed is:

1. A photographic printing apparatus comprising:
   exposing means for printing an image of a photographic film on a photographic sensitive material;
   supplementary information exposing means for printing supplementary information on part of said photographic sensitive material; and
   dimming means for suppressing light projected to a selected region within a print region when said image of said photographic film is printed on said photographic sensitive material;
   wherein said supplementary information exposing means is operable to print said supplementary information in said selected region.

2. A photographic printing apparatus as defined in claim 1, wherein said dimming means is operable to vary said selected region.

3. A photographic printing apparatus as defined in claim 1, further comprising dimming position control means for determining a size and position of said selected region based on photograph size information of said image of said photographic film, and setting and varying said selected region to be dimmed by said dimming means based on said position and size determined.

4. A photographic printing apparatus as defined in claim 1, wherein said dimming means is operable to dim light by a variable quantity.

5. A photographic printing apparatus as defined in claim 4, further comprising density detecting means for detecting density information on said image of said photographic film, and dimming quantity control means for controlling a quantity of light dimmed by said dimming means based on said density information detected by said density detecting means.

6. A photographic printing apparatus as defined in claim 1, wherein said dimming means includes a plurality of filters having different ratios of transmittance, and filter drive means for advancing and retracting each of said filters to/from a printing optical path extending to said photographic sensitive material.

7. A photographic printing apparatus as defined in claim 5, wherein said dimming means includes a nematic liquid crystal panel disposed on a printing optical path extending to said photographic sensitive material, said dimming quantity control means determining a voltage to be applied to said nematic liquid crystal panel such that said nematic liquid crystal panel has a predetermined ratio of transmittance.

8. A photographic printing apparatus as defined in claim 5, wherein said dimming means includes a nematic liquid crystal panel disposed on a printing optical path extending to said photographic sensitive material, said dimming quantity control means determining a period for applying a voltage to said nematic liquid crystal panel such that said nematic liquid crystal panel has a predetermined integrated quantity of light transmission.

9. A photographic printing apparatus as defined in claim 1, wherein said dimming means includes a smectic liquid crystal panel disposed on a printing optical path extending to said photographic sensitive material, and heating means for heating part of said smectic liquid crystal panel.

10. A photographic printing apparatus as defined in claim 1, wherein said supplementary information exposing means includes a lith film recording said supplementary information, and a light source for printing said supplementary information recording on said lith film on said photographic sensitive material.

11. A photographic printing apparatus as defined in claim 1, wherein said supplementary information exposing means includes an exposure head for dividing said supplementary information into a plurality of regions, and controlling exposure of each of said plurality of regions.

12. A photographic printing apparatus as defined in claim 11, wherein said exposure head includes PLZT arrays for exposing, line by line, said supplementary information divided into said plurality of regions.

13. A photographic printing apparatus as defined in claim 11, wherein said exposure head includes LED arrays for exposing, line by line, said supplementary information divided into said plurality of regions.

14. A photographic printing apparatus as defined in claim 11, wherein said exposure head includes a CRT for exposing said supplementary information divided into said plurality of regions.

15. A photographic printing apparatus as defined in claim 1, wherein said supplementary information exposing means is switchable between an ordinary exposure state for exposing an information portion of said supplementary information to said photographic sensitive material, and a reverse exposure state for exposing a background portion of said supplementary information.

16. A photographic printing apparatus as defined in claim 15, further comprising density detecting means for detecting density information on said image of said photographic film, and exposure state control means for switching said supplementary information exposing means between said normal exposure state and said reverse exposure state.

17. A photographic printing apparatus as defined in claim 16, wherein said density detecting means comprises a CCD line sensor for reading image information from said photographic film.

* * * * *